US012105212B2

(12) United States Patent
Yoshida (10) Patent No.: US 12,105,212 B2
(45) Date of Patent: Oct. 1, 2024

(54) POSITION MEASUREMENT APPARATUS, POSITION MEASUREMENT METHOD AND PROGRAM

(71) Applicant: Nippon Telegraph and Telephone Corporation, Tokyo (JP)

(72) Inventor: Seiji Yoshida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 325 days.

(21) Appl. No.: 17/637,896

(22) PCT Filed: Sep. 12, 2019

(86) PCT No.: PCT/JP2019/035885
§ 371 (c)(1),
(2) Date: Feb. 24, 2022

(87) PCT Pub. No.: WO2021/048971
PCT Pub. Date: Mar. 18, 2021

(65) Prior Publication Data
US 2022/0276395 A1     Sep. 1, 2022

(51) Int. Cl.
*G01S 19/48*     (2010.01)
*H04W 4/029*    (2018.01)

(52) U.S. Cl.
CPC ............ *G01S 19/48* (2013.01); *H04W 4/029* (2018.02)

(58) Field of Classification Search
CPC ....... H04W 64/00; H04W 4/02; H04W 4/029; H04W 64/003; H04W 4/024; H04W 4/33;
(Continued)

(56) References Cited

U.S. PATENT DOCUMENTS

2010/0138147 A1   6/2010  T'Siobbel
2011/0211511 A1*  9/2011  Bakthavathsalu .......................... H04W 52/0254
                                                                       370/311
(Continued)

FOREIGN PATENT DOCUMENTS

JP    H9-62353      3/1997
JP    2010-530958   9/2010
(Continued)

OTHER PUBLICATIONS

Kikuchi, "Research on calculation of reliability index in GNSS/INS combined positioning", Master's thesis, Tokyo University of Marine Science and Technology, 2016, 46 pages (with English Translation).
(Continued)

*Primary Examiner* — Kwasi Karikari
(74) *Attorney, Agent, or Firm* — Fish & Richardson P.C.

(57) ABSTRACT

A position measurement apparatus for measuring an absolute position of a mobile object, the position measurement apparatus includes one or more computers each including a memory and a processor configured to measure the absolute position of the mobile object based on signals transmitted from navigation satellites; measure a displacement of the mobile object from a certain position; and switching between measuring the absolute position of the mobile object and measuring the displacement of the mobile object from the certain position in accordance with a plan which is created in advance or created during movement of the mobile object.

8 Claims, 7 Drawing Sheets

(58) Field of Classification Search
CPC ....... H04W 4/027; H04W 4/38; H04W 12/63; H04W 56/0065; H04W 76/14
See application file for complete search history.

(56) References Cited

U.S. PATENT DOCUMENTS

| | | | | |
|---|---|---|---|---|
| 2012/0007776 A1* | 1/2012 | Ariel | ....................... | G01S 19/11 |
| | | | | 342/357.48 |
| 2014/0107919 A1* | 4/2014 | Venkatraman | ........ | G01S 5/0264 |
| | | | | 701/466 |
| 2016/0061957 A1* | 3/2016 | Li | .......................... | H04W 4/02 |
| | | | | 342/357.42 |

FOREIGN PATENT DOCUMENTS

| | | |
|---|---|---|
| JP | 2017-009429 | 1/2017 |
| JP | 2017-219542 | 12/2017 |

OTHER PUBLICATIONS

Delamer et al., "MOMDP modeling for UAV safe path planning in an urban environment," Artificial Intelligence Platform (PFIA17), Jul. 3-7, 2017, Normandy, France, 16 pages.
Nishi et al., "Consideration for precision improvement of GNSS time synchronization in the multipath environment," IEICE Technical Reports, Jul. 2016, 116(123):35-42, 18 pages.

* cited by examiner

POSITION MEASUREMENT APPARATUS, POSITION MEASUREMENT METHOD AND PROGRAM

CROSS-REFERENCE TO RELATED APPLICATIONS

This application is a National Stage application under 35 U.S.C. § 371 of International Application No. PCT/JP2019/035885, having an International Filing Date of Sep. 12, 2019, the disclosure of which is considered part of the disclosure of this application, and is incorporated in its entirety into this application.

TECHNICAL FIELD

The present invention relates to a technique for measuring an absolute position of a mobile object with high accuracy.

BACKGROUND ART

In recent years, positioning using a global navigation satellite system (GNSS) has been used in a wide range of applications.

Examples of the positioning using the GNSS include code-based positioning for obtaining a positioning accuracy of several meters, and carrier-phase-based positioning for realizing a centimeter-level positioning accuracy.

One application that employs the positioning using the GNSS is positioning for an automatic traveling vehicle. A submeter positioning accuracy for absolute positions (an order of several centimeters to several tens of centimeters) is required for the automatic traveling vehicle in order to allow lane determination, and thus the carrier-phase-based positioning is assumed to be used.

CITATION LIST

Non Patent Literature

[NPL 1] Ren Kikuchi, "Research on calculation of reliability index in GNSS/INS combined positioning", Master's thesis, Tokyo University of Marine Science and Technology, March, 2016, http://www.denshi.e.kaiyodai.acjp/jp/content2.html

SUMMARY OF THE INVENTION

Technical Problem

The positioning using the GNSS has a problem that the GNSS positioning accuracy may significantly deteriorate in an urban canyon reception environment where buildings are present in a surrounding area. In addition, a GNSS signal (a signal transmitted from a navigation satellite, which may be referred to as a navigation satellite signal) cannot be received in a tunnel, under an elevated bridge, or the like, and thus the positioning using the GNSS may become impossible to be performed.

It is conceivable that both absolute positioning using the GNSS and relative displacement positioning using an inertial measurement unit (IMU), a sensor, or the like are used in combination by reactively switching between an absolute positioning a relative displacement positioning in accordance with a reception quality of the GNSS signal. Note that the "reception quality" mentioned in the present specification includes determination of whether signals are received from a sufficient number of navigation satellites in a foresight state for highly accurate positioning, in addition to a reception intensity of the navigation satellite signal, and the like. In addition, the "absolute positioning" refers to measuring an absolute position, but means in particular the positioning using the GNSS in the present specification.

However, in a case where the measurement accuracy of an absolute position is low, the absolute position cannot be measured with high accuracy even when the measurement accuracy of a relative displacement is high. For this reason, in a reactive switching method in which switching is performed after the reception quality of a GNSS signal is degraded, a measurement accuracy of an absolute position may be lowered.

In addition, there is a technique for estimating an absolute position of a vehicle using a camera mounted on the vehicle or remote sensing, by using a dynamic map including information on lanes of roads and 3D (three-dimensional) structures (guard rails, traffic lights, and the like), but more accurate positioning of an absolute position is required for manufacturing the dynamic map, which has the same problem as above.

The present invention is contrived in view of the above-described circumstances, and an object thereof is to provide a technique capable of accurately measuring an absolute position of a mobile object even when a travel path of the mobile object includes a location where a GNSS signal cannot be received or a location where reception quality is not good.

Means for Solving the Problem

According to the disclosure, a position measurement apparatus for measuring an absolute position of a mobile object is provided. The position measurement apparatus includes:

an absolute position measuring unit configured to measure the absolute position of the mobile object based on signals transmitted from navigation satellites;

a relative displacement measuring unit configured to measure a displacement of the mobile object from a certain position; and a positioning control unit configured to measure the absolute position of the mobile object by using the absolute position measuring unit and the relative displacement measuring unit in a switching manner in accordance with a plan which is created in advance or created during movement of the mobile object.

Effects of the Invention

According to the disclosed technology, a technique capable of accurately measuring an absolute position of a mobile object, even when a travel path of a mobile object includes a location where a GNSS signal cannot be received or a location where reception quality is not good is provided.

DESCRIPTION OF EMBODIMENTS

Hereinafter, an embodiment of the present invention (the present embodiment) will be described with reference to the drawings. The embodiment to be described in the following is merely exemplary, and an embodiment to which the present invention is applied is not limited to the following embodiment.

In the following embodiment, a vehicle that travels on a road is an example of a mobile object to be subjected to position measurement, but this is merely an example. The present invention is applicable to any mobile object that is not limited to vehicles traveling on roads.

(Apparatus Configuration)

Figure 1:
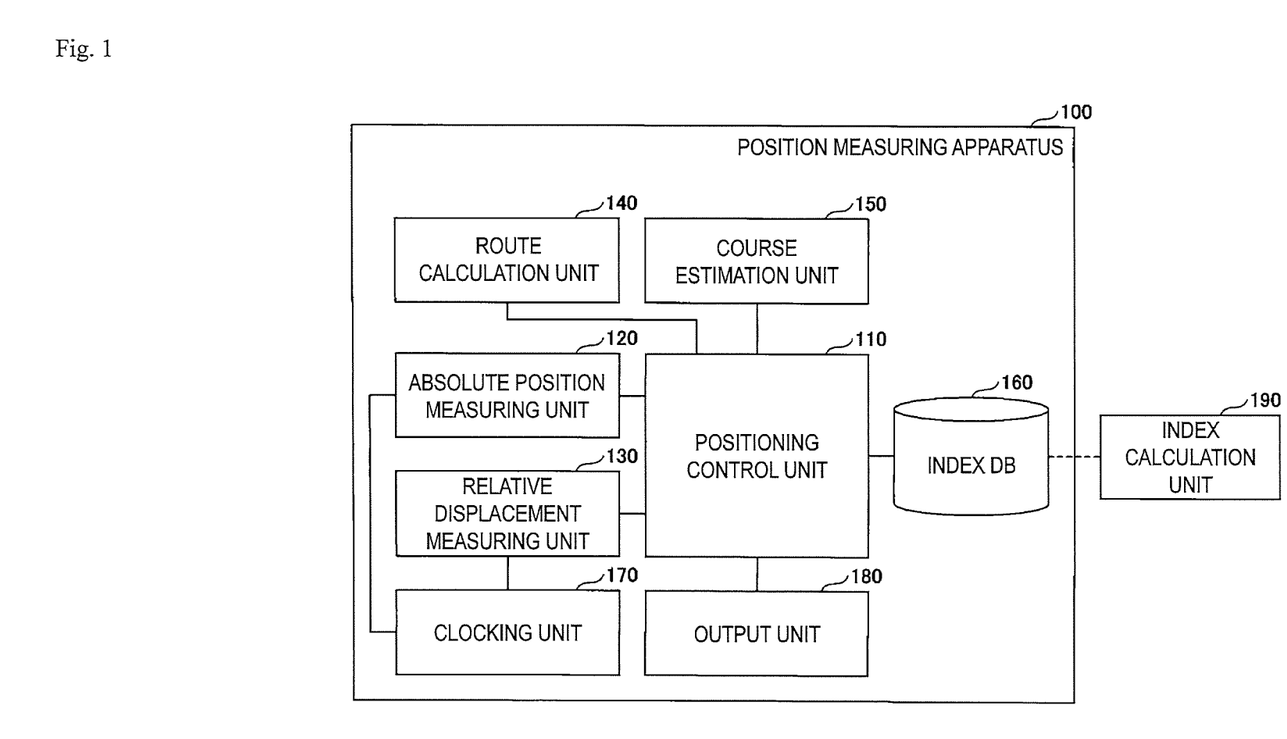
FIG. 1 is a diagram illustrating a functional configuration of a position measurement apparatus according to an embodiment of the present invention.

FIG. 1 is a diagram illustrating a functional configuration of a position measurement apparatus 100 according to the present embodiment. As illustrated in FIG. 1, the position measurement apparatus 100 according to the present embodiment includes a positioning control unit 110, an absolute position measuring unit 120, a relative displacement measuring unit 130, a route calculation unit 140, a course estimation unit 150, an index DB 160, a clocking unit 170, and an output unit 180.

In the present embodiment, calculation of an index stored in the index DB 160 is performed outside the position measurement apparatus 100, which is indicated as an index calculation unit 190. However, the index calculation unit 190 may be provided in the position measurement apparatus 100. Outlines of the respective functional units are as follows. More specific operations will be described in an example to be described later.

The positioning control unit 110 executes control for proactively performing switching between positioning using the absolute position measuring unit 120 and positioning using the relative displacement measuring unit 130 in accordance with a scenario (which may also be referred to as a plan) determined based on a route along which traveling is scheduled.

The absolute position measuring unit 120 is a GNSS carrier-phase-based positioning receiver. However, a GNSS receiver other than the carrier-phase-based positioning method may be used as the absolute position measuring unit 120 depending on the application of the position measurement apparatus 100.

The relative displacement measuring unit 130 is a vehicle speed pulse meter, an IMU, an in-vehicle camera, or the like. The speed of a vehicle, that is, a distance over which the vehicle moves per unit time can be acquired by the vehicle speed pulse meter. A three-dimensional angular velocity and an acceleration are obtained using a three-axis gyro and a three-directional accelerometer by the IMU. For example, a displacement (an orientation and a distance of movement) from a certain position per unit time can be obtained by the vehicle speed pulse meter and the IMU.

The route calculation unit 140 calculates and outputs a route through which a mobile object will travel, based on a departure point (start point) and a destination (end point). The course estimation unit 150 estimates and outputs a future course (a route including time information from the current location to a certain point) of the mobile object based on, for example, the past movement history, the current date and time, the current position, a travel direction, a speed, and the like. Note that any of the route calculation unit 140 and the course estimation unit 150 may be provided.

The index DB 160 stores an absolute positioning accuracy index calculated by the index calculation unit 190. The absolute positioning accuracy index is an index indicating how accurately absolute positioning can be performed using the GNSS, and is a value for each position or a value for each position and time slot.

The clocking unit 170 is a timepiece including an oscillator such as a crystal. The output unit 180 outputs a current position which is a result of positioning. Although the current position is represented by three-dimensional coordinates of (x, y, z), information to be output varies depending on its application. For example, a control signal may be output to a control unit of an automatic traveling vehicle, or image information indicating a position on a map may be output.

The position measurement apparatus 100 may be one apparatus which is physically integrated, or may be an apparatus in which some functional units are physically separated and the plurality of separated functional units are connected through a network. For example, the positioning control unit 110 may be a computer operating in accordance with a program, and the other functional units may be configured to be connected to the computer. In addition, the positioning control unit 110, the route calculation unit 140, the course estimation unit 150, the index DB 160, the clocking unit 170, and the output unit 180 are computers operating in accordance with a program, and the other functional units may be configured to be connected to the computers.

Furthermore, the position measurement apparatus 100 may be used such that the entire position measurement apparatus is mounted on a mobile object, or may be used such that a portion of the entire position measurement apparatus is mounted on the mobile object. For example, the absolute position measuring unit 120 and the relative displacement measuring unit 130 may be mounted on the mobile object, and the other functional units may be provided at a remote location (for example, a data center that implements a cloud, or the like).

In addition, carrier-phase-based positioning computation may be performed on the cloud by outputting observation data (also referred to as raw data) from the GNSS carrier-phase-based positioning receiver of the absolute position measuring unit 120, and transmitting the observation data to a carrier-phase-based positioning computation processing functional unit provided on the cloud. In this case, positioning computation results are returned from the carrier-phase-based positioning computation processing functional unit on the cloud to the positioning control unit 110.

(Example of Hardware Configuration)

Figure 2:
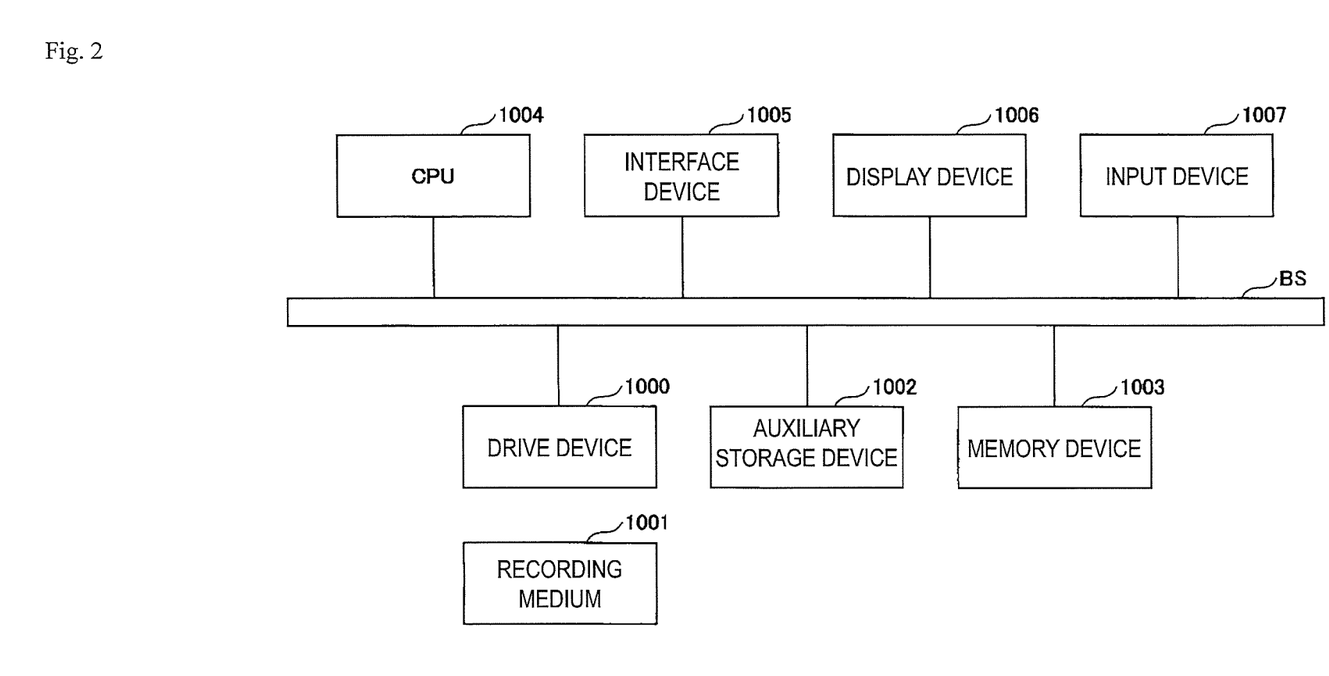
FIG. 2 is a diagram illustrating an example of a hardware configuration of the position measurement apparatus.

FIG. 2 is a diagram illustrating an example of a hardware configuration of the above-described computer in the present embodiment. The computer in FIG. 2 includes a drive device 1000, an auxiliary storage device 1002, a memory device 1003, a CPU 1004, an interface device 1005, a display device 1006, an input device 1007, and the like which are connected to one another through a bus B.

A program for implementing processing in the computer is provided by, for example, a recording medium 1001, such as a CD-ROM or a memory card. When the recording medium 1001 that stores a program is set in the drive device

1000, the program is installed in the auxiliary storage device 1002 from the recording medium 1001 via the drive device 1000. Here, the program may not necessarily be installed from the recording medium 1001, and may be downloaded from another computer via a network. The auxiliary storage device 1002 stores the installed program and also stores necessary files, data, and the like.

The memory device 1003 reads out the program from the auxiliary storage device 1002 and stores the program in a case where an instruction to start the program is given. The CPU 1004 realizes functions related to the positioning control unit 110 and the like in accordance with the program stored in the memory device 1003. The interface device 1005 is used as an interface for connection to a network. The display device 1006 displays a graphical user interface (GUI) or the like according to a program. The input device 1007 is constituted by a keyboard, a mouse, buttons, a touch panel, or the like, and is used to input various operation instructions.

(Calculation of Absolute Positioning Accuracy Index)

A method of calculating an absolute positioning accuracy index to be stored in the index DB 160 will be described. The index calculation unit 190 calculates, in advance, an index of absolute positioning accuracy expected at each point from circumstances of structures (a building, an elevated structure, a tunnel, or the like) around a road.

The index calculation unit 190 creates index information as a function of a position from the index at each point (each position), and stores the index information in the index DB 160. The index information may be created as a function of a position and time (or a time slot) and may be stored in the index DB 160.

Examples of the method of calculating an absolute positioning accuracy index include a method of calculating an absolute positioning accuracy index from results data of position measurement. In this method, for example, position measurement is performed with measuring means equivalent to the absolute position measuring unit 120 at each point where an accurate position is known. The index calculation unit 190 collects positional information of each point and measurement results and calculates an index based on the positional information and the measurement results. An index at each point is calculated such that an index is set to 5 when an error between an actual position and a position which is a measurement result is equal to or less than a predetermined threshold value A, and an index is set to 4 when the error is within a range of from the threshold value A to a threshold value B (which is greater than the threshold value A). An index changes depending on time, and thus an index on time basis or time slot basis may be calculated at each point.

In addition, the method of calculating an absolute positioning accuracy index from results data of position measurement may include, for example, collecting results of obtaining a convergence (FIX) solution of GNSS carrier-phase-based positioning and a variation in positioning results due to positioning performed intrinsically off a road where cars and pedestrians are located, by the index calculation unit 190 through crowd sourcing, and calculating indexes at respective points from these pieces of information.

In addition, the index calculation unit 190 may include a GNSS signal simulator and calculate an index using the GNSS signal simulator.

A GNSS reception signal at any point on the earth and at any time can be generated by the GNSS signal simulator, and position measurement can be performed in a simulated manner using the GNSS reception signal.

In a case where the GNSS signal simulator is used, it is possible to distinguish between a line-of-sight (LOS: a foresight state) and a non line-of-sight (NLOS: a state of being blocked by a structure) of a GNSS signal at a certain reception position and at any time by using geospatial information (3D map).

It is possible to calculate a time average of an LOS satellite ratio, which is a ratio (percentage) of a number of GNSS signals received from an LOS satellite to a number of all GNSS signals in the sky (above the horizon) for a fixed period of time (for example, 24 hours) by using the function. Further, it is also possible to estimate the LOS satellite ratio at a certain future time at any position. The higher the LOS satellite ratio, the higher the expected positioning accuracy, and thus the LOS satellite ratio can be used as an index.

In an urban canyon reception environment, an open space in which a GNSS signal can be received in a foresight state is limited, and a multipath signal obtained by reflecting and diffracting the GNSS signal by a building is received, thereby greatly deteriorating the positioning accuracy. It is possible to estimate an occurrence situation of a multipath signal at any time and at any point through ray trace simulation using geospatial information (3D map) by the GNSS signal simulator.

The index calculation unit 190 may have the above-described multipath signal estimation function to calculate an index by reflecting the deterioration of the positioning accuracy due to a multipath signal having a large delay. For example, an index may be calculated based on presence or absence of a multipath signal having a delay equal to or greater than a certain threshold value, a number of multipath signals having a delay equal to or greater than the certain threshold value, a ratio of the number of multipath signals having a delay equal to or greater than the certain threshold value to a number of direct waves, or the like.

Furthermore, a pseudo signal may be generated at any point and at any time by the GNSS signal simulator, positioning may be performed by a GNSS receiver equivalent to the absolute position measuring unit 120, and an index may be calculated based on a deviation of a positioning result from a true value. For example, in the same manner as the above-described method, the index calculation unit 190 calculates an index at each point such that an index is set to 5 when an error between a true value and a position which is a positioning result is equal to or less than a predetermined threshold value A, and the index is set to 4 when the error is within a range of from the threshold value A to a threshold value B (which is greater than the threshold value A).

The index calculation unit 190 creates an index on position basis (or an index on position and time basis) by the above-described GNSS signal simulator and stores the created index in the index DB 160.

Note that preparing indexes and scenarios in advance is an example. The index calculation unit 190 (or the positioning control unit 110) may calculate an index at each point at a predicted arrival time on a route through which traveling is scheduled, for example, based on an LOS satellite ratio by using the above-described function of the GNSS signal simulator based on a position at each time and the predicted arrival time on the route during traveling, store the calculated index in the index DB 160, and use the stored index to create a scenario (or use the index directly to create a scenario without storing the index in the index DB 160).

EXAMPLES

Figure 3:
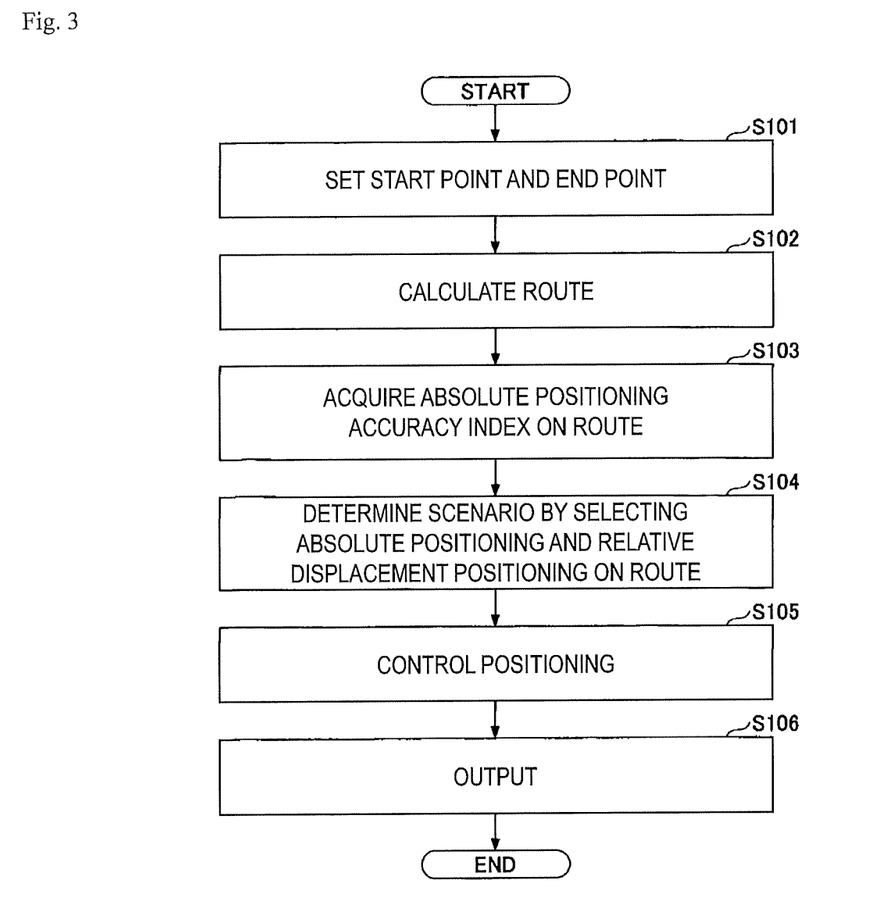
FIG. 3 is a flowchart illustrating a first example of a processing procedure of the position measurement apparatus.

Processing procedure examples of the position measurement apparatus 100 will be described below as a practical example. FIG. 3 is a flowchart illustrating a first example of the processing procedure of the position measurement apparatus 100.

The first example of the processing procedure assumes a case where a vehicle having the position measurement apparatus 100 mounted thereon travels from a predetermined departure point (start point) to a predetermined destination (end point). The vehicle may be an automatic traveling vehicle or a vehicle driven by a person.

In S101 (step 101), the departure point which is the start point and the destination which is the end point are input to the route calculation unit 140. In S102, the route calculation unit 140 calculates a route from the departure point to the destination, and outputs the route to the positioning control unit 110. Information of the calculated route includes a position on time basis when the time at the departure point is set to 0, based on an assumed vehicle speed, together with positional information of the route. Note that, in addition to the assumed vehicle speed, traffic congestion information and the like may be applied.

In S103, the positioning control unit 110 acquires an absolute positioning accuracy index at each point on the route calculated in S102 with reference to the index DB 160.

In S104, the positioning control unit 110 determines the scenario of positioning by selecting a section for performing the absolute positioning and a section for performing the relative displacement positioning on the route, based on the absolute positioning accuracy index on the route which is acquired in S103. The determined scenario is stored in storage means such as a memory.

Figure 5:
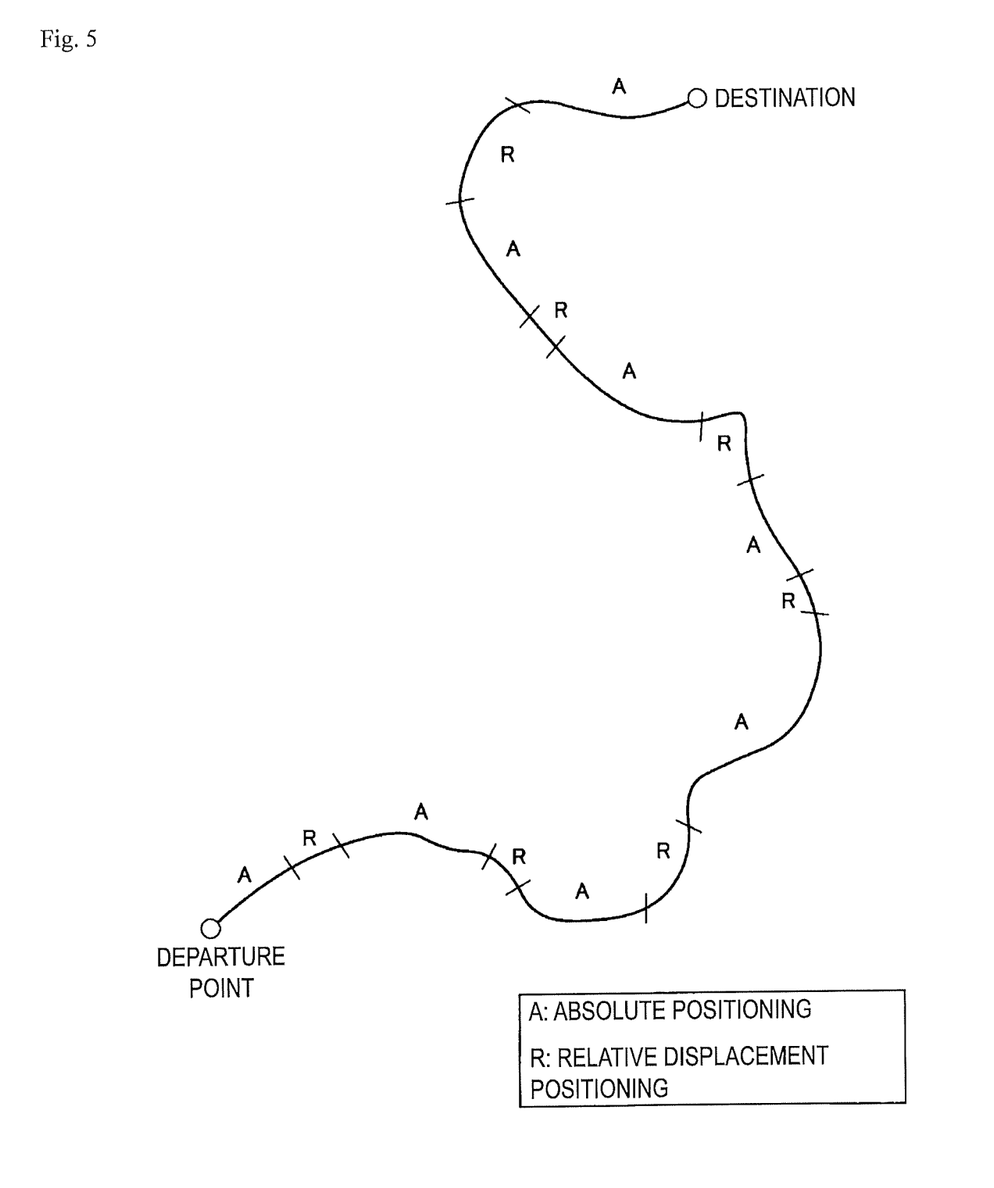
FIG. 5 is a diagram illustrating an example of a scenario.

FIG. 5 is a diagram schematically illustrating an example of the scenario created in S104. As illustrated in FIG. 5, the scenario is constituted by sections for performing the absolute positioning and section for performing the relative displacement positioning on the route from the departure point to the destination. A boundary between the section for performing the absolute positioning and the section for performing the relative displacement positioning is a switching point. In a case where an index is calculated during traveling of a vehicle and a scenario is created, for example, a scenario of a path from the departure point to a certain point is created at the time of departure, a scenario of a path from the point to another point is created before the vehicle arrives at the point, and finally a scenario of a path from a certain point to the destination is created.

Basically, the positioning control unit 110 uses indexes at the respective positions on the route, for example, to determine a section constituted by positions on the route, each having the index value equal to or greater than a predetermined value, to be a section for performing the absolute positioning, and determine a section other than the section to be a section for performing the relative displacement positioning. A region on the route in which a reception environment with good foresight is continuously obtained, an intersection with good foresight, and the like are the section for performing the absolute positioning.

In addition, the positioning control unit 110 may adjust the relative displacement positioning section and the absolute positioning section in accordance with the performance of the relative displacement measuring unit 130 included in the position measurement apparatus 100. For example, in a case where the relative displacement measuring unit 130 can perform highly accurate measurement over a long distance, the relative displacement positioning section can be set longer than in a case where the relative displacement measuring unit 130 cannot perform the highly accurate measurement over a long distance.

Note that it is necessary to acquire accurate absolute positioning results by receiving a high-quality GNSS signal at an entry (switching point) and an exit (switching point) of the relative displacement positioning section, and thus a section having a buffer to a certain degree is set as a relative displacement positioning section before and after a section in which a GNSS signal cannot be received, such as a tunnel, or a section having a poor reception quality. For example, even in a case where the index value is good to a point just before an entry of a tunnel, a relative displacement positioning section is set to start from a point before the entry of the tunnel by a buffer length.

In addition, for the exit side of the relative displacement positioning section, a buffer for taking into account a time for capturing a GNSS signal and a time for solving wavenumber ambiguity of the carrier-phase-based positioning, in other words, time to first fix (TTFF) is required.

The positioning control unit 110 determines a buffer length in accordance with, for example, an assumed vehicle speed, a reception quality of a GNSS signal at predicted arrival time for the point, and the like. In addition, the positioning control unit 110 may determine the buffer length based on the actual vehicle speed, the actual reception quality of a GNSS signal, and the like during traveling of the vehicle.

In S105 of FIG. 3, the positioning control unit 110 causes the absolute position measuring unit 120 or the relative displacement measuring unit 130 to perform positioning in accordance with the scenario created in S104, and outputs positioning results from the output unit 180 in S106. Details of S105 will be described later.

For example, in a case where a target vehicle is an automatic traveling vehicle, the positioning results (current position) output from the output unit 180 are transmitted to a control unit of the automatic traveling vehicle, to be used for handle control, speed control, and the like. Further, in a case where a target vehicle is a vehicle driven by a person, the positioning results (current position) output from the output unit 180 are displayed on a navigation screen.

Figure 4:
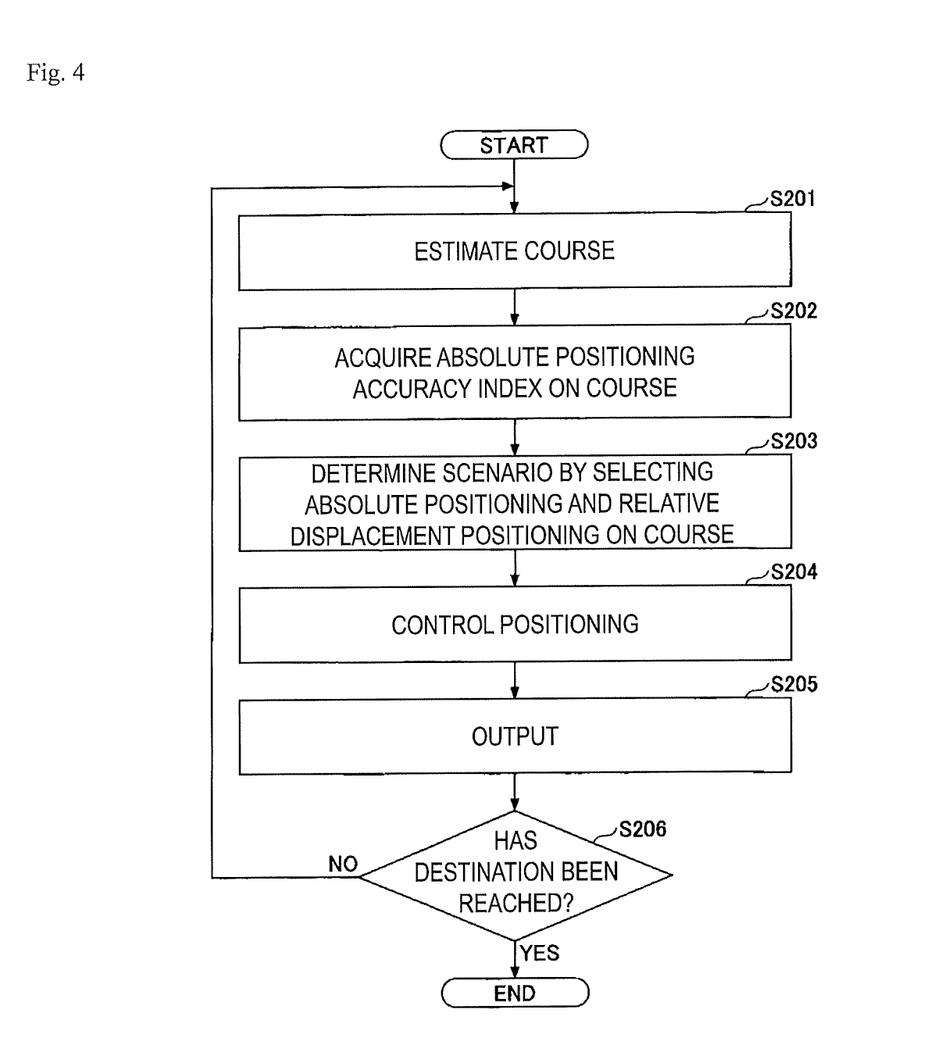
FIG. 4 is a flowchart illustrating a second example of the processing procedure of the position measurement apparatus.

FIG. 4 is a flowchart illustrating a second example of the processing procedure. FIG. 4 illustrates an example in which a switching point is set based on an estimated course without inputting a departure point or a destination.

First, in S201, the course estimation unit 150 estimates a course of a vehicle (a route from a current location to a certain point) based on a past movement history, current date and time, a current position, and the like at the time of departure.

Details of processes in S202 to S205 are the same as those in S103 to S106 in FIG. 3. In S206, the course estimation unit 150 determines whether the current location is the destination based on the past movement history, the current date and time, the current position, and the like. When the current location is not the destination, the course estimation unit 150 returns to S201 and performs the processes in S202 to S205 for the next course. When the current location is determined to be the destination in S206, the processing ends.

<Positioning Control Operation>

Figure 6:
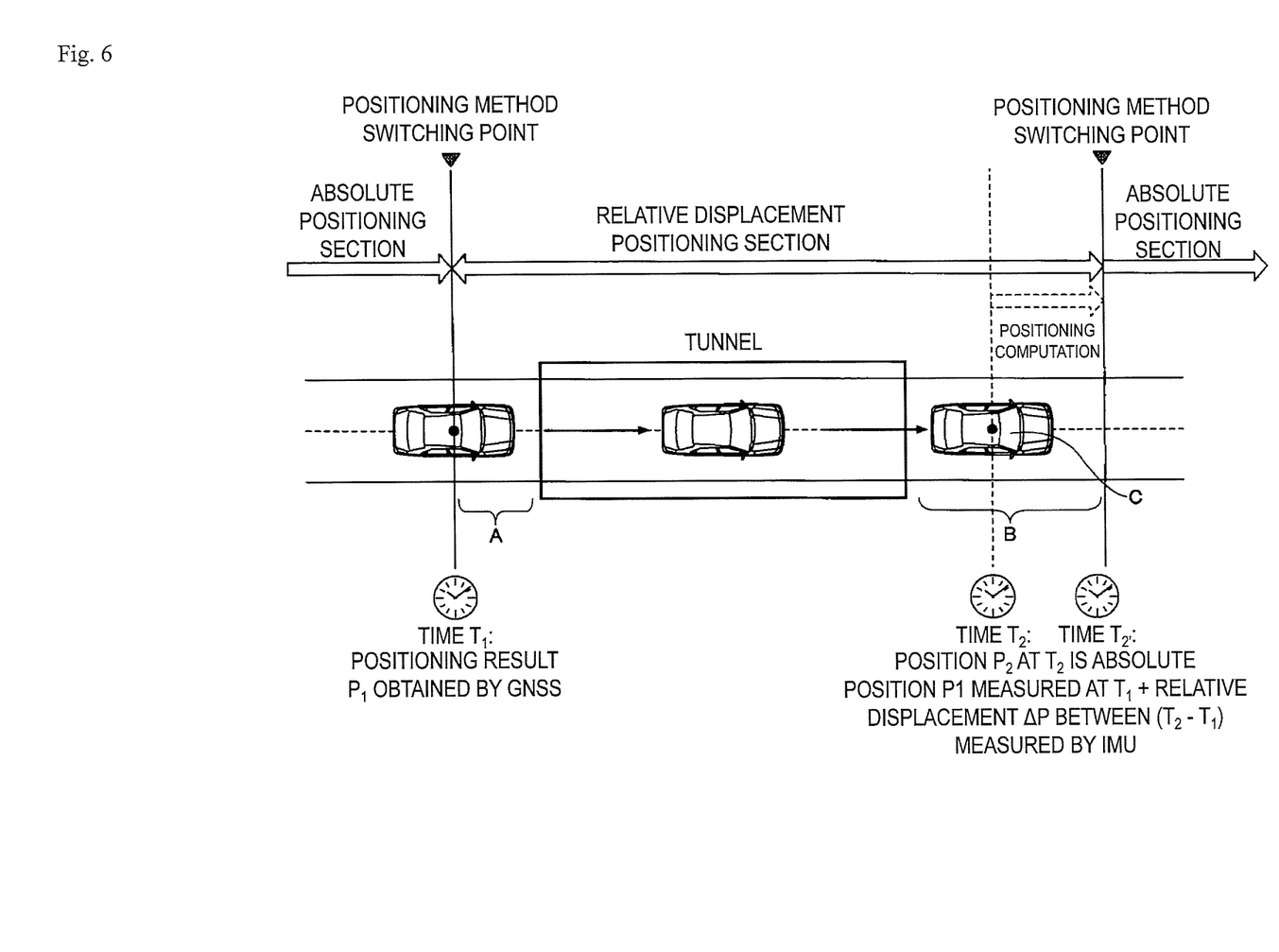
FIG. 6 is a diagram illustrating an example of switching between absolute positioning and relative positioning.

An example of a positioning control operation in S105 of FIG. 3 (S204 of FIG. 4) will be described with reference to FIG. 6. In the example of FIG. 6, a section of "tunnel with buffers before and after tunnel" is set as a relative displacement positioning section, and sections before and after the relative displacement positioning section are set as absolute positioning sections.

A vehicle moves from left to right in FIG. 6. In FIG. 6, a buffer A ranging from a point at which "the absolute positioning section is switched to the relative displacement positioning section" to an entry of the tunnel, and a buffer B ranging from an exit of the tunnel to a point at which "the relative displacement positioning section is switched to the absolute positioning section" are illustrated.

When the positioning control unit 110 detects that the current position of the vehicle is at the point where the absolute positioning section is switched to the relative displacement positioning section, the positioning control unit 110 switches the positioning means from the absolute position measuring unit 120 to the relative displacement measuring unit 130.

That is, as illustrated in FIG. 6, in a vehicle traveling in the absolute positioning section, when the positioning control unit 110 detects that a positioning result of the absolute position measuring unit 120 (GNSS) indicates a point where the absolute positioning section is switched to the relative displacement positioning section, the positioning control unit 110 switches the positioning means from the absolute position measuring unit 120 to the relative displacement measuring unit 130.

Switching of the positioning means from the absolute position measuring unit 120 to the relative displacement measuring unit 130 may indicate that the absolute position measuring unit 120 is instructed to stop measurement and the relative displacement measuring unit 130 is instructed to start measurement, or may indicate that both the absolute position measuring unit 120 and the relative displacement measuring unit 130 are operated at all times, and the positioning control unit 110 switches a positioning result to be used from a positioning result of the absolute position measuring unit 120 to a positioning result of the relative displacement measuring unit 130.

The positioning control unit 110 holds a position $P_1$, which is a positioning result of the absolute position measuring unit 120 at the switching point, and an absolute time obtained by the absolute position measuring unit 120 together with the positioning result, and calculates an absolute position of the vehicle in the relative displacement positioning section based on the position $P_1$ and a displacement measured by the relative displacement measuring unit 130.

For example, as illustrated in FIG. 6, an absolute position $P_2$ at time $T_2$ is calculated as a sum of the absolute position $P_1$ at the time $T_1$ and a relative displacement during $(T_2-T_1)$ measured by the relative displacement measuring unit 130.

Here, $T_1$ is an accurate absolute time obtained based on a GNSS signal by the absolute position measuring unit 120. On the other hand, $T_2$ is time obtained by the clocking unit 170 included in the position measurement apparatus 100.

Assume that the vehicle moves straight ahead at a speed of S per unit time, and the relative displacement measuring unit 130 correctly measures the movement. In this case, if $T_2$ measured by the clocking unit 170 is an exact absolute time, $\Delta P = S(T_2-T_1)$ is a correct displacement.

On the other hand, for example, if the clocking unit 170 is behind the exact absolute time, and the point in time of $T_2$ measured by the clocking unit 170 is actually an absolute time "$T_2+\Delta T$", $\Delta P$ calculated as $\Delta P = S(T_2-T_1)$ is smaller than the actual displacement by $S\Delta T$. That is, when the clocking unit 170 is inaccurate, the positioning result obtained by the position $P_1$ and the positioning result $\Delta P$ of the relative displacement measuring unit 130 is inaccurate.

In a case where the positioning result is inaccurate, the positioning result at the exit of the relative displacement positioning section and the positioning result at the entry of the absolute positioning section are different from each other when the relative displacement positioning section is switched to the absolute positioning section, which results in a defect. An error falling within the degree of positioning accuracy of the absolute positioning is acceptable. However, when the relative displacement positioning section is switched to the absolute positioning section in a case where the error exceeds the positioning accuracy of the absolute positioning, a defect such as a sudden change in the positioning result may occur.

Figure 7:
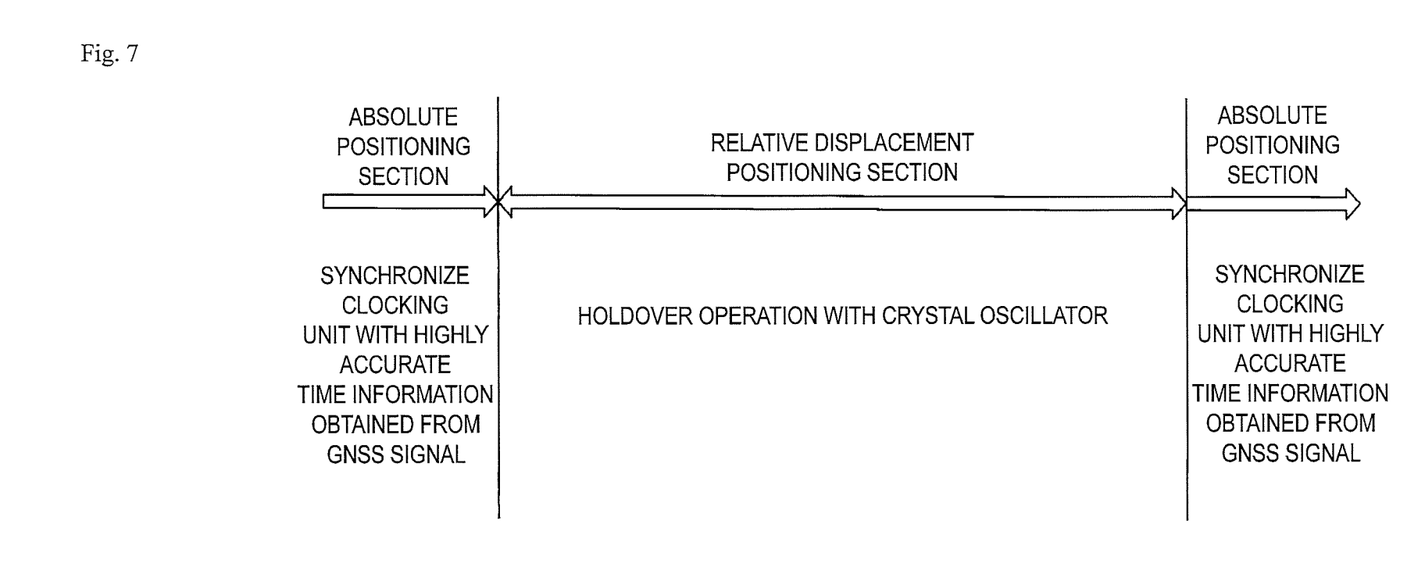
FIG. 7 is a diagram illustrating an operation of time acquisition.

In the present embodiment, as illustrated in FIG. 7, an accurate absolute time obtained by the absolute position measuring unit 120 is transmitted to the clocking unit 170, and thus the absolute time obtained by the absolute position measuring unit 120 and the time measured by the clocking unit 170 are synchronized with each other. In the relative displacement positioning section in which a GNSS signal cannot be received (or the reception quality is poor), the clocking unit 170 performs a holdover operation with the frequency stability of the oscillator such as crystal, and thus an accurate absolute time can be output.

The absolute position measuring unit 120 captures a GNSS signal received from a satellite until a point in time at a position of C from the exit of the tunnel in FIG. 6. However, a time for solving wavenumber ambiguity of the carrier-phase-based positioning is required, and a point at which the relative displacement positioning section is switched to the absolute positioning section is set after a distance (time) in which the wavenumber ambiguity can be solved.

Computation for solving wavenumber ambiguity starts at the point C (initial coordinates). The positioning control unit 110 determines the position of the initial coordinates based on a relative displacement of the vehicle between a point at which the absolute positioning section is switched to the relative displacement positioning section and the point at which the relative displacement positioning section is switched to the absolute positioning section.

The initial coordinates are normally calculated from the code positioning at the point C. However, in the present embodiment, initial coordinates close to a true value calculated based on a relative displacement through accurate clocking rather than the code positioning are used. Thereby, there is an effect that it is possible to reduce a computation time, that is, TTFF, for solving wavenumber ambiguity.

At the point at which the relative displacement positioning section is switched to the absolute positioning section, the positioning control unit 110 switches positioning means from the relative displacement measuring unit 130 to the absolute position measuring unit 120. Thereafter, absolute positioning is performed by the absolute position measuring unit 120.

Effects of Embodiment

As described above, according to the present embodiment, it is possible to accurately measure an absolute position of a mobile object even when a travel path of the mobile object includes a location where a GNSS signal cannot be received or a location where reception quality is not good. That is, it is possible to increase the availability of the positioning and to realize highly accurate positioning by suitably using positioning means in a proactive manner in accordance with a road environment or the like.

Summary of Embodiment

In the present embodiment, at least the following position measurement apparatus, the position measurement method, and the program are provided.

(Item 1)

A position measurement apparatus for measuring an absolute position of a mobile object, the position measurement apparatus including:

an absolute position measuring unit configured to measure the absolute position of the mobile object based on signals transmitted from navigation satellites;

a relative displacement measuring unit configured to measure a displacement of the mobile object from a certain position; and a positioning control unit configured to measure the absolute position of the mobile object by using the absolute position measuring unit and the relative displacement measuring unit in a switching manner in accordance with a plan which is created in advance or created during movement of the mobile object.

(Item 2)

The position measurement apparatus according to item 1, the positioning control unit acquiring an index on a path, through which the mobile object is scheduled to move, from a database that stores an index indicating accuracy of positioning for each position based on the signals transmitted from the navigation satellites, and creating the plan based on the index.

(Item 3)

The position measurement apparatus according to item 2, the index being a value determined based on a ratio of a number of signals received from navigation satellites in a foresight state to a number of all signals received from the navigation satellites at a predicted arrival time at each position on the path through which the mobile object is scheduled to move.

(Item 4)

The position measurement apparatus according to any one of items 1 to 3, further including:

a clocking unit configured to clock an absolute time by being synchronized with an absolute time acquired by the absolute position measuring unit, and by performing a holdover operation in a case where the absolute position measuring unit is not able to acquire the absolute time.

(Item 5)

The position measurement apparatus according to any one of items 1 to 4, the plan being information including a first section and a second section, the first section being for performing measurement by the absolute position measuring unit on the path through which the mobile object is scheduled to move, and the second section being for performing measurement by the relative displacement measuring unit on the path.

(Item 6)

The position measurement apparatus according to item 5, the second section including a section in which a signal is not able to be received from the navigation satellites with a good quality, and buffers before and after the section.

(Item 7)

A position measurement method executed by a position measurement apparatus for measuring an absolute position of a mobile object, the position measurement apparatus including an absolute position measuring unit configured to measure the absolute position of the mobile object based on signals transmitted from navigation satellites, and a relative displacement measuring unit configured to measure a displacement of the mobile object from a certain position, the position measurement method including:

measuring the absolute position of the mobile object by using the absolute position measuring unit and the relative displacement measuring unit in a switching manner in accordance with a plan which is created in advance or created during movement of the mobile object.

(Item 8)

A program causing a computer to function as the positioning control unit in the position measurement apparatus according to any one of items 1 to 6.

Although the present embodiment has been described above, the present invention is not limited to such a specific embodiment, and various modifications and changes may be made within the scope of the gist of the present invention described in the claims.

REFERENCE SIGNS LIST

100 Position measurement apparatus
110 Positioning control unit
120 Absolute position measuring unit
130 Relative displacement measuring unit
140 Route calculation unit
150 Course estimation unit
160 Index DB
170 Clocking unit
180 Output unit
190 Index calculation unit
1000 Drive device
1002 Auxiliary storage device
1003 Memory device
1004 CPU
1005 Interface device
1006 Display device
1007 Input device

The invention claimed is:

1. A position measurement apparatus configured to measure an absolute position of a mobile object, the position measurement apparatus comprising:

one or more computers each including a memory and a processor configured to:

measure the absolute position of the mobile object based on signals transmitted from navigation satellites;

measure a displacement of the mobile object from a certain position;

switch between measuring the absolute position of the mobile object and measuring the displacement of the mobile object from the certain position in accordance with a plan which is created in advance or created during movement of the mobile object; and determine a length of a buffer based on at least one of a predicted speed of the mobile object or a reception quality of the signals transmitted from the navigation satellites, wherein the buffer is allocated to precede and follow the switching.

2. The position measurement apparatus according to claim 1, wherein the memory and the processor are further configured to acquire an index on a path, through which the mobile object is scheduled to move, from a database that stores an index indicating accuracy of positioning for each position based on the signals transmitted from the navigation satellites, and to create the plan based on the index.

3. The position measurement apparatus according to claim 2,
wherein the index is a value determined based on a ratio of a number of signals received from navigation satellites in a foresight state to a number of all signals received from the navigation satellites at a predicted arrival time at each position on the path through which the mobile object is scheduled to move.

4. The position measurement apparatus according to claim 1,
wherein the memory and the processor are further configured to:
synchronize with an absolute time acquired upon measuring the absolute position of the mobile object based on the signals transmitted from the navigation satellites, and
perform a holdover operation in a case where the absolute time is not able to be acquired, to clock the absolute time.

5. The position measurement apparatus according to claim 2,
wherein the plan is information including a first section, in which the absolute position on the path through which the mobile object is scheduled to move is measured based on the signals transmitted from the navigation satellites, and a second section, in which the displacement of the mobile object from the certain position is measured on the path.

6. The position measurement apparatus according to claim 5,
wherein the second section includes a section in which a signal is not able to be received from the navigation satellites with a good quality, and the buffers before and after the section.

7. A position measurement method executed by a position measurement apparatus configured to measure an absolute position of a mobile object, the position measurement apparatus including one or more computers each including a memory and a processor, the method comprising:
measuring the absolute position of the mobile object based on signals transmitted from navigation satellites;
measuring a displacement of the mobile object from a certain position;
switching between measuring the absolute position of the mobile object and measuring the displacement of the mobile object from the certain position in accordance with a plan which is created in advance or created during movement of the mobile object; and
determining a length of a buffer based on at least one of a predicted speed of the mobile object or a reception quality of the signals transmitted from the navigation satellites,
wherein the buffer is allocated to precede and follow the switching.

8. A non-transitory computer-readable recording medium having computer-readable instructions stored thereon, which when executed cause a computer including a memory and a processor to execute respective operations in the position measurement apparatus according to claim 1.

* * * * *

UNITED STATES PATENT AND TRADEMARK OFFICE
CERTIFICATE OF CORRECTION

| | | |
|---|---|---|
| PATENT NO. | : 12,105,212 B2 | Page 1 of 1 |
| APPLICATION NO. | : 17/637896 | |
| DATED | : October 1, 2024 | |
| INVENTOR(S) | : Seiji Yoshida | |

It is certified that error appears in the above-identified patent and that said Letters Patent is hereby corrected as shown below:

On the Title Page

Column 1, (72) Inventor: please delete "Musashino (JP)" and replace with -- Tokyo (JP) --

Signed and Sealed this
Sixth Day of January, 2026

John A. Squires
*Director of the United States Patent and Trademark Office*